June 19, 1956

E. F. BRINKER 2,751,560

HIGH FREQUENCY CAPACITATOR

Filed March 16, 1953

2 Sheets-Sheet 1

2,751,560
Patented June 19, 1956

2,751,560

HIGH FREQUENCY CAPACITATOR

Emil F. Brinker, Matawan, N. J., assignor to Lavoie Laboratories, Inc., Morganville, N. J., a corporation of New Jersey Application March 16, 1953, Serial No. 342,667
4 Claims. (Cl. 333—97)

The present invention relates to high frequency capacitators for use in balanced transmission lines.

At frequencies such as those commonly used in radio and audio circuits, the design of condensers is well understood and well developed. However, at very high frequency, for example frequencies of the order of 1000 megacycles, serious problems are encountered in condenser design. Practices followed in designing condensers for lower frequencies have been found inapplicable and unsatisfactory for high frequency work. Among the difficulties that have been experienced are unacceptably high losses, lack of resetability, low Q, limited tuning range and instability.

It is an object of the present invention to provide an improved high frequency capacitator to be used in balanced transmission lines. In particular, it is an object of the invention to provide a high frequency capacitator having a high Q, high stability, wide tuning range and good resetability permitting the resetting of a selected frequency at a specific calibrated setting. The capacitator is especially suitable for use on relatively long transmission lines of the balanced line type. It has substantially the same characteristic impedance as the transmission line and its minimum capacity is small and distributed. The relatively simple structure of the capacitator in accordance with the invention makes it easy and economical to manufacture and facilitates the production of successive units having substantially identical characteristics.

The nature, objects and advantages of the invention will be more fully understood from the following description and claims in conjunction with the accompanying drawings, in which:

Figures 1, 2:
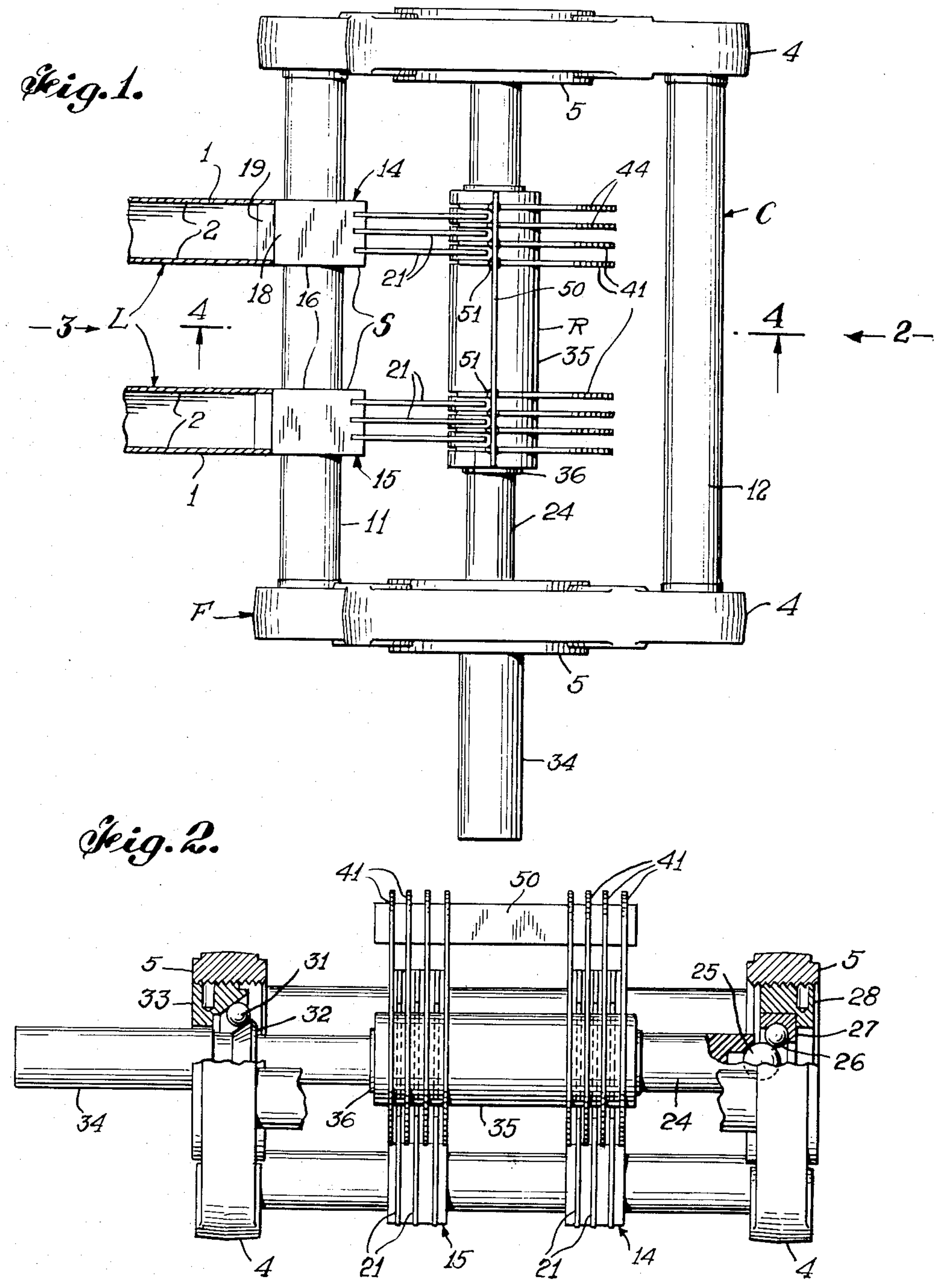
Fig. 1 is a plan view, partly in section, of a capacitator in accordance with the invention.
Fig. 2 is a side view taken from the right hand side in Fig. 1, certain parts being broken away and shown in section.

The capacitator C illustrated by way of example in the drawings is shown connected in a balanced transmission line L having two conductors 1 which are hollow and rectangular in cross section, with parallel side walls 2. The conductors 1 are spaced apart and are parallel to one another, with the flat side walls 2 of one conductor parallel to like side walls of the other conductor.

The capacitator C comprises a frame F, stator S and rotor R. The frame F comprises two end plates 4 and a plurality of connecting rods extending between the end plates. The end plates 4 are spaced apart and parallel to one another and are made of strong rigid material, for example metal, that is dimensionally stable under operating conditions. Each of the end plates 4 has a central apertured boss 5 (Fig. 4), apertured bosses 6 and 7 to receive the connecting rods and mounting bosses 8. The bosses are connected with one another by stiffening ribs 9, the portions of the end plate between the bosses and ribs being relatively thin.

The number of connecting rods extending between the end plates 4 may be varied with the size and design of the capacitator. As illustrated in the drawings, there are two connecting rods 11 at one side of the central bosses 5 and one connecting rod 12 at the other side, the connecting rods being thus arranged in a triangular pattern. The connecting rods 11 and 12 are cylindrical rods formed of strong, stable, electrically insulating material, for example fused quartz, ceramic or plastic material. The ends of the connecting rods fit tightly in the apertures in the bosses 6 and 7 of the end plates 4 so that the connecting rods and end plates together form a rigid, stable, assembly. Preferably, the ends of the connecting rods are metallized and soldered into the apertures in the bosses of the end plates.

The stator S comprises two stator units 14 and 15 which are of like construction. Each of the stator units comprises a metal base member or block 16 having a rectangular cross section substantially equal to that of the conductors 2 of the transmission line L. The base members 16 are mounted on the two connecting rods 11 which extend through two holes in each of the base members. Preferably, metal sleeves 17 (Fig. 5) are shrunk onto the rods 11 at the positions which the base members of the stator are to occupy and the base members are then soldered to the sleeves. Alternatively, the rods 11 are metallized at the zones where the blocks 16 are to be positioned and the blocks are soldered to the rods. The two base members 16 are parallel to one another and spaced apart a distance equal to the spacing of the conductors 1 of the balanced transmission line L. At one end, each of the base members 16 has a shoulder 18 and a reduced end portion 19 having a cross section corresponding to the inside dimensions of the conductor 1. The conductor fits onto the reduced portion 19 and abuts the shoulder 18 with the outside surface of the conductor 1 substantially flush with that of the respective base member 16 of the stator. A soldered connection is preferably made between the ends of the transmission line and the stator units. The base members 16 of the stator thus form continuations of the conductors of the balanced transmission line and have substantially the same characteristic impedance as the transmission line.

At the other end of each of the base members 16 of the stator, there are formed a plurality of parallel grooves into which metal stator blades 21 are set and preferably soldered. Each stator unit is shown as having three blades which are substantially rectangular with arcuate recesses 22 at the outer ends of the blades. The stator blades are parallel to one another and to the side walls 2 of the conductors of the transmission line. The width of the stator blades in a vertical direction is substantially equal to the vertical width of the conductors 1 so that the group of blades on each of the base members 16 form a further continuation of the conductor with substantially the same electrical characteristics as the conductor at the frequency for which the capacitator is intended.

The rotor R comprises a shaft 24 which is rotatably supported by the frame and formed of strong, stable, electrically insulating material, for example fused quartz, ceramic or plastic material. As illustrated in the drawings (Fig. 2), a central ball 25 seated in a recess at one end of the shaft 24 is rotatably supported by a circular series of smaller balls 26 running in an annular raceway 27 supported by an annular bushing 28 which is externally threaded and is screwed into a correspondingly internally threaded aperture in the boss 5 of one of the end plates 4.

The shaft 24 is rotatably supported in the opposite end plate 4 of the frame by a circular series of balls 31 running between an inner conical race 32 on the shaft and an outer conical race provided in an annular bushing or collar 33 which is externally threaded and screwed into a correspondingly internally threaded aperture in the boss 5 of said end plate. The ball bearings thus provided for the shaft 24 act as radial bearings and opposing thrust bearings. By selectively screwing the bushings 28 and 33 in or out, the tightness of the bearings can be adjusted and the shaft 24 can also be adjusted in an axial direction. A shaft extension 34 projects beyond the end plate 4 and provides means for turning the shaft 24. The extension 34 is preferably a metal shaft which is hollow, at least at its inner end, so as to fit on, and be soldered to, the end of shaft 24. The inner bearing race 32 is preferably formed integral with the shaft extension 34.

Figures 3, 4, 5:
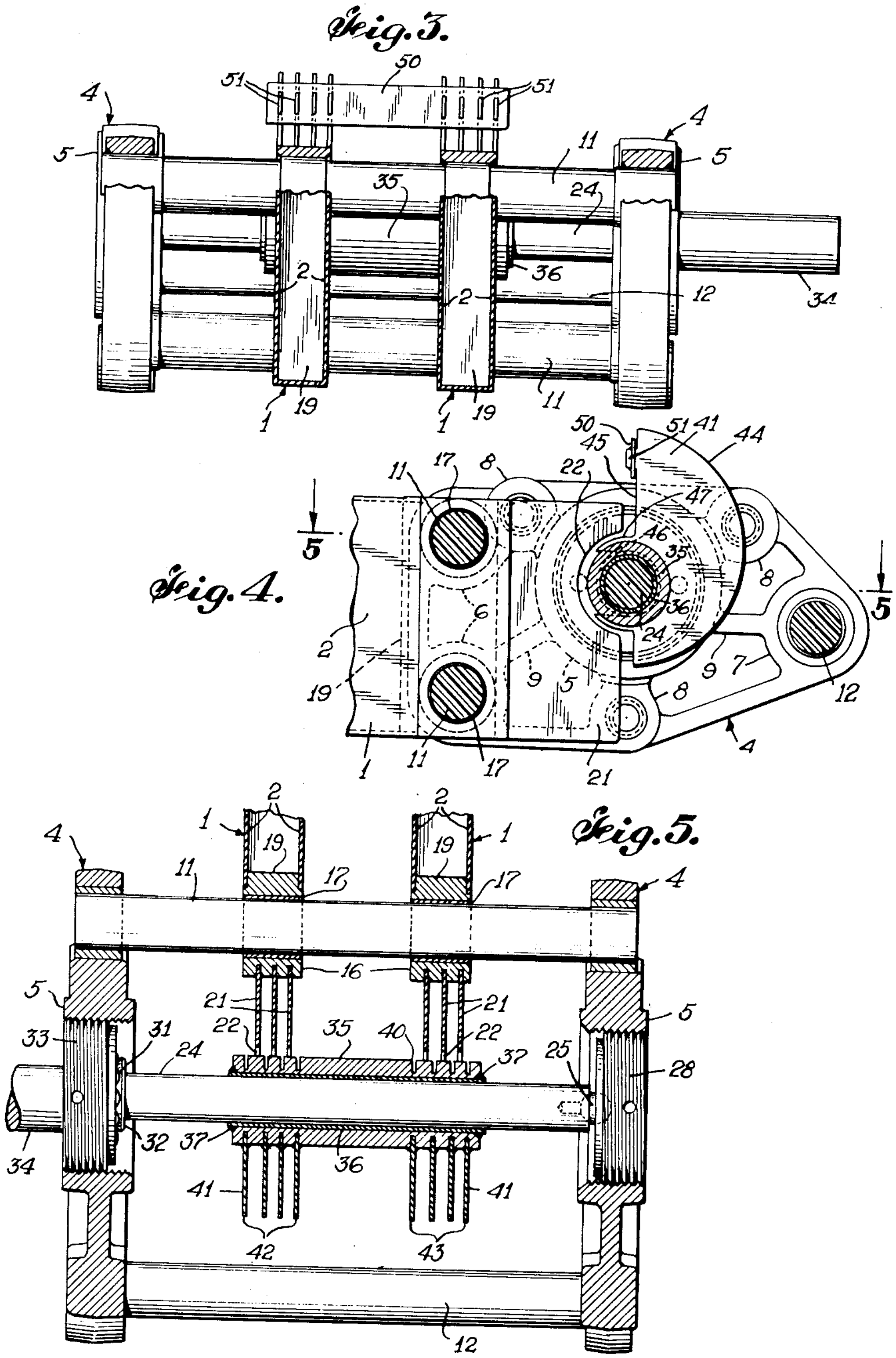
Fig. 3 is a side view taken from the left hand side of Fig. 1, with certain parts broken away and shown in section.
Fig. 4 is a cross section taken approximately on the line 4—4 in Fig. 1.
Fig. 5 is a longitudinal section taken approximately on the line 5—5 in Fig. 4.

A metal sleeve or hub 35 is fixed onto the rotatable shaft 24, for example by being soldered to a relatively thin inner sleeve 36 (Fig. 5) which is shrunk on the shaft 24. The hub 35 has an internal diameter such that it fits closely on the inner sleeve 36 after the latter has been shrunk onto the shaft 24. The soldering of the hub to the inner sleeve is indicated at 37. A plurality of rotor blades 41 are mounted on the hub 35 by being set in circumferential grooves 40 provided in the hub and preferably soldered. The rotor blades 41 are divided into two groups 42 and 43 which are spaced apart from one another on the hub, the rotor blades of one group being interleaved with the blades of one stator unit and the rotor blades of the other group being interleaved with the blades of the other stator unit. As illustrated in the drawings, there are four rotor blades in each group. Each of the rotor blades is generally semi-circular with an arcuate or curved edge 44 and a generally straight edge 45, the term "semi-circular" being used in a broad sense to include blades of which the curved edge 44 is a spiral, involute, or other continuous or discontinuous curve, as well as one in which the curved edge 44 is arcuate. An arcuate recess 46 is provided in the straight edge 45 of each rotor blade, being of such radius as to fit in the grooves 40 of the rotor hub 35. Projecting finger portions 47 provided on the blades 41 adjacent recesses 46 partially embrace the hub 35 and help position the blades perpendicular to the shaft 24. The recesses 46 are eccentric with respect to the semi-circular rotor blades, as shown in Fig. 4, the eccentricity being such as to give a logarithmic tuning curve. When the stator units and the rotor are assembled in the frame, the arcuate recesses 22 in the ends of the stator blades accommodate the rotor hub 35 with suitable clearance at least equal to the clearance between the interleaved rotor and stator blades. As the rotor is turned, the areas of the rotor blades disposed between the stator blades is correspondingly increased or decreased. By means of the threaded bushings 28 and 33, described above, the rotor can be adjusted in an axial direction so as to line up exactly with the stator units.

The two groups of rotor blades 42 and 43 are electrically connected by the metal rotor hub 35. One group of blades is also connected with the other group of blades at their outer peripheries by means of a metal bar 50 (Figs. 2 and 3). The bar 50 is electrically connected to the blades of both groups 42 and 43, for example by having spaced apertures fitting over projecting tongues 51 provided on the blades and by being soldered to the blades. The connection of the blades of one group with those of the other group, not only at their inner peripheries by the metal hub 35 but also at their outer peripheries by the bar 50, reduces the inductance of the assembly.

The capacitator in accordance with the invention is so constructed that expansion and contraction with changes in temperature do not produce undesirable stresses or distortion in the structure. The connecting rods 11 and 12 of the frame and the shaft 24 of the rotor are all made of the same material or at least of material having substantially the same coefficient of expansion. Hence they all expand and contract together so that the end plates and the stator and rotor blades stay parallel. Likewise, the blocks 16 of the stator are made of the same metal as the end plates 4 or at least a metal having substantially the same coefficient of expansion. No bending stress is put on the rods 11 carrying the blocks 16 since these blocks expand and contract with the end plates. Hence, these rods stay parallel with one another and with rod 12 and shaft 24. There is thus provided a precision capacitator that holds its calibration accurately over long periods of time despite temperature variations.

It will be noted that the capacitator in accordance with the invention has no moving electrical contacts, thus eliminating a source of inaccuracy. Its minimum capacity is small while its maximum capacity is relatively large, thus giving a wide tuning range, for example a range of 1 to 3. The capacity is distributed rather than lumped. The capacitator is physically large in proportion to its capacity, making it unnecessary to work with minute parts or make fine adjustments. The structure of the capacitator makes it easy to reproduce in quantity production with successive units substantially identical in their characteristics.

Where reference is made to certain parts being soldered, this term is used in a broad sense to cover other ways of joining the parts, including welding, sweating and brazing.

It will be understood that the invention is not limited to the specific embodiment shown by way of example in the drawings and that modifications may be made in it within the scope of the following claims.

What I claim and desire to secure by Letters Patent is:

1. In a balanced transmission line having a pair of laterally spaced parallel rectangular conductors, a high frequency capacitator comprising a pair of spaced stator units comprising base portions forming continuations respectively of said conductors and having substantially the same cross sectional size and shape and the same electrical transmission characteristics as said conductors and a plurality of laterally spaced parallel blades forming continuations of said base portions said parallel blades having their sides parallel to the sides of said rectangular conductors, and a rotor comprising a shaft normal to said blades, two groups of spaced blades mounted on said shaft, said groups being spaced apart from one another in a direction axial of said shaft direction and the blades of said groups interleafing respectively with the blades of said stator units, and a conducting bar electrically connecting one of said groups of rotor blades with the other of said groups of rotor blades adjacent the outer peripheries of said blades.

2. In a balanced transmission line comprising a pair of spaced conductors of rectangular cross section, a high frequency capacitator comprising a pair of spaced stator units comprising base portions having substantially the same cross sectional size and shape as said conductors and fitting onto the ends of said conductors to form a continuation of said balanced transmission line and a plurality of spaced parallel blades projecting from said base portions and forming a further continuation of said line substantially parallel to said conductors, and a rotor comprising a shaft formed of insulating material and being mounted normal to said blades, a metal sleeve fixed on said shaft and having a plurality of spaced circumferential grooves, blades set in said grooves and disposed approximately perpendicular to said shaft, said rotor blades being arranged in two groups spaced from one another in a direction axial of said shaft, the rotor blades of one group interleafing with the stator blades of one stator unit and the rotor blades of the other group interleafing with the stator blades of the other stator unit, and a bar of conducting material electrically interconnecting the rotor blades of one group with the rotor blades of the other group adjacent the outer peripheries of said rotor blades.

3. A high frequency capacitator according to claim 2, in which a thin cylindrical metal bushing is fixed on said shaft and said metal sleeve fits closely over said bushing and is fixed thereto.

4. In a balanced transmission line comprising a pair of spaced parallel conductors of rectangular cross section, a high frequency capacitator comprising a pair of spaced stator units each comprising a block of rectangular cross section of substantially the same size and shape as said conductors, one end of each block fitting on and being electrically connected to an end of one of said conductors so that the blocks form a substantially uniform continuation of said line, the opposite end of each block being slotted with a plurality of spaced parallel slots, and a plurality of blades set in said slots and forming a further continuation of said line, and a rotor comprising a rotatably supported shaft of insulating material mounted normal to said blades, a metal sleeve fixed on said shaft and having a plurality of circumferential grooves, a plurality of rotor blades being provided with eccentric recesses, the eccentricity being such as to give a logarithmic tuning curve, the edges of the rotor blades defining said recesses being set in said grooves, said rotor blades being arranged in two groups spaced from one another in a direction axial of said shaft, the rotor blades of one group interleafing with the stator blades on one of said blocks and the rotor blades of the other group interleafing with the stator blades on the other of said blocks, and a bar of conducting material electrically interconnecting the rotor blades of one group with the rotor blades of the other group adjacent their outer peripheries.

References Cited in the file of this patent

UNITED STATES PATENTS

| | | |
|---|---|---|
| 1,563,893 | Cohen | Dec. 1, 1925 |
| 2,252,103 | Vivie | Aug. 12, 1941 |
| 2,277,638 | George | Mar. 24, 1942 |
| 2,366,750 | Pray | Jan. 9, 1945 |
| 2,545,623 | MacKenzie | Mar. 20, 1951 |

FOREIGN PATENTS

| | | |
|---|---|---|
| 554,801 | Great Britain | July 20, 1943 |
| 910,965 | France | Feb. 25, 1946 |